INVENTOR
Armand G. Charron
BY Stevens, Davis, Miller & Mosher
ATTORNEYS

Sept. 13, 1960 A. G. CHARRON 2,952,557

METHOD AND APPARATUS FOR COATING DISKS

Filed Sept. 28, 1955 2 Sheets-Sheet 2

INVENTOR

Armand G. Charron

BY Stevens, Davis, Miller & Mosher

ATTORNEYS

United States Patent Office 2,952,557

Patented Sept. 13, 1960

2,952,557

METHOD AND APPARATUS FOR COATING DISKS

Armand G. Charron, Dallas, Tex., assignor to Texas Instruments Incorporated, Dallas, Tex., a corporation of Delaware Filed Sept. 28, 1955, Ser. No. 537,221

1 Claim. (Cl. 117—4)

This invention relates to a novel process for producing coated disks for use in magnetic recording and to apparatus useful for coating disks. More particularly, the present invention relates to a process for coating a disk with a magnetic permeable composition and to apparatus to be utilized in coating disks with a composition as above mentioned.

There has been a recent trend in the field of magnetic recording towards recording a plurality of channels on a suitable record medium. This technique is particularly useful as a means for studying complex wave forms or wave forms simultaneously derived from a plurality of independent sources which are to be compared. This technique of recording has been commonly referred to as multi-channel recording.

One particularly adaptation of this technique is in the field of seismic surveying. It has already been proposed to record magnetically the output signals from the several seismometers of a seismic spread and record them individually and simultaneously upon a moving magnetic medium. Hithertofore, the recording of seismic signals has principally been effected on magnetic mediums in the form of a tape. It has very recently been proposed to record the plurality of signals from the several seismometers on a magnetic coated disk.

It is accordingly an object of the present invention to provide a method for coating a dispersion of magnetic particles on both sides of a disk so that wave form information can be recorded on both sides of the disk whereby the utility of the recording medium can be increased twofold.

It is a further object of the present invention to provide a novel method for coating a disk on both sides with a dispersion of magnetic particles which method can be carried out in an efficient and expedient fashion to produce finished disks in a relatively short time.

It is a still further object of the present invention to provide apparatus to be employed in the coating of disks, the operation of which apparatus is efficient and economical.

Other and further objects of the present invention will become readily apparent from the following detailed description when taken in conjunction with the illustrations of the drawings.

Figures 1, 3:
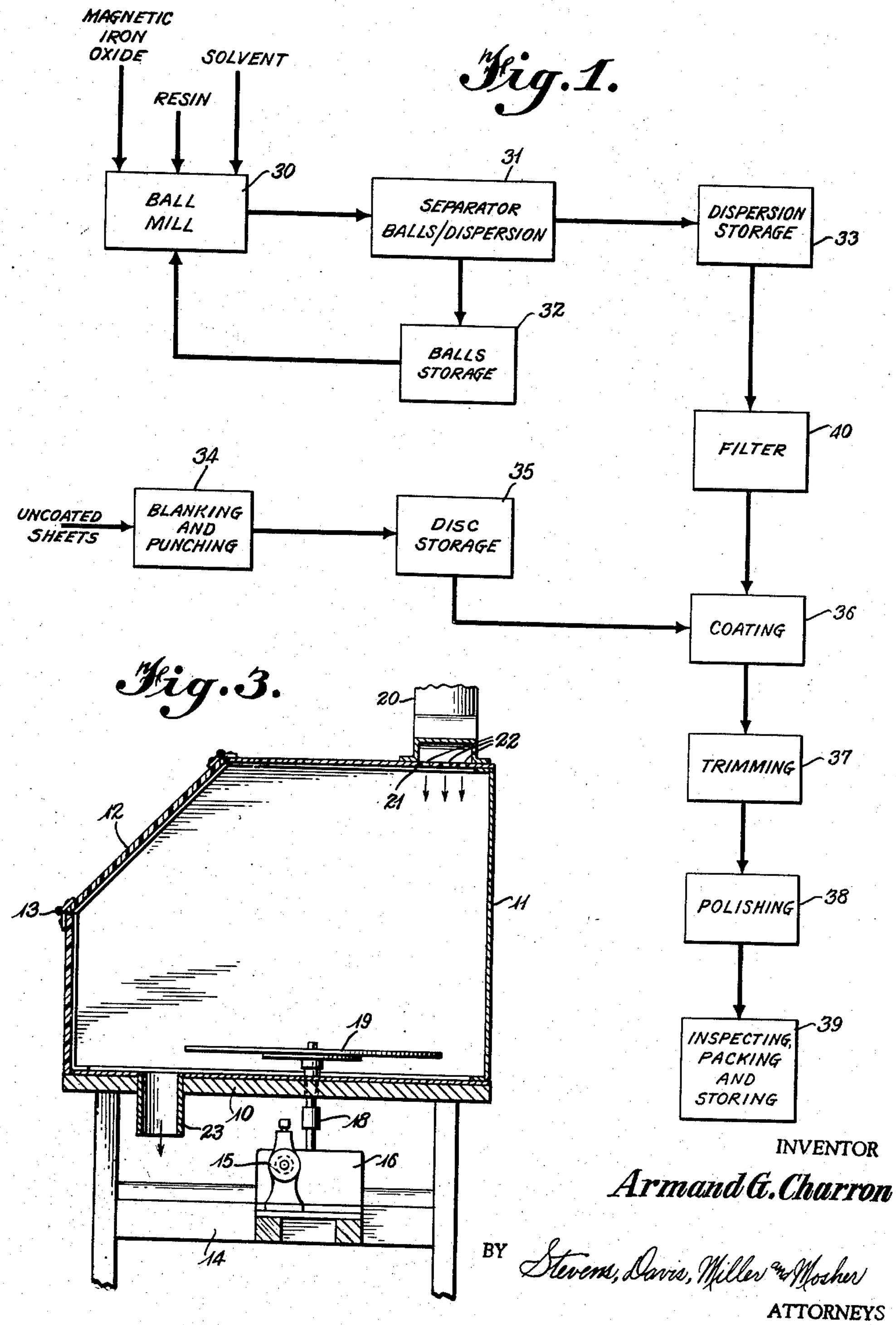
Figure 1 is a schematic view showing in block diagram the essential steps of the method of the present invention.
Figure 3 is a view in section taken along line 3—3 of Figure 2.

Referring now to the drawings and in particular to Figure 1, the essential steps of the method will be described. It is desirable in carrying out this process to initially prepare the dispersion or coating material and also to prepare uncoated square and rectangular sheets of the base material upon which the coating is to be disposed. Referring first to the preparation of the coating composition, it will be noted from Figure 1 that magnetic iron oxide particles together with a suitable resin and solvents are introduced into a ball mill, block 30. The relative proportions of the several ingredients must be kept within specific limits in order that the coating composition will have desirable viscosity characteristics. The ratio of magnetic iron oxide particles to resin binder, as well as the ratio of solids to solvents, are significant proportions in determining the final composition. As will be evident, the term "solids" includes the resin binder as well as the oxide particles. Within the purview of the present invention the magnetic iron oxide particles may be present in the composition from about 70 to 85% by weight of the total amount of magnetic iron oxide and binder. The resin binder may be present from about 15% to 30% by weight based upon the total weight of magnetic iron oxide and binder. It is preferable, however, that approximately 75% of the total combined weight of magnetic iron oxide and binder be magnetic iron oxide and the remaining 25% be the binder. The above two ingredients will constitute the solids of the composition and will be mixed only with the solvent. On the basis of solids and solvents, the solids will constitute from about 30% to 40% by weight of the total mass. The solvents will accordingly constitute from 60% to 70% by weight. It is preferred, however, that the solids constitute approximately 35% and that the solvents constitute the remaining 65%.

The binder which is employed in the present composition may be any resin which is conventionally employed as a binder for magnetic iron oxide particles. There may be mentioned in this connection the copolymer of polybutadiene with acrylonitrile, methyl esters of acrylic acid, and vinyl polymers alone or in mixture. The solvent employed may be any one of a number of conventional solvents for this type of composition. There may be mentioned in this regard toluol, isopropyl acetate, methyl ethyl ketone, etc.

After the several ingredients have been introduced into the ball mill as shown in Figure 1, they are mixed together to form the desired dispersion of magnetic iron oxide particles, resin and solvent. The mass is then withdrawn from the ball mill including the balls and introduced into a separator 31 wherein the dispersion and the balls are separated with the balls being sent to a suitable container 32 for storage and eventually returned to the ball mill. The dispersion withdrawn from the separator is sent to a suitable container 33 for storage until the time of the actual coating step. It will be appreciated that the magnetic iron oxide dispersion is formulated in the ball mill at a desirable and consistent viscosity which allows for a uniform and consistent flow pattern at time of use.

Uncoated sheets are introduced into a blanking and punching operation as indicated by block 34 in Figure 1. The uncoated sheets forming the basis for the coating composition are preferably composed of "Mylar," which is a polyester film, produced commercially by Du Pont. The sheets are roughly 20" x 20" and of a thickness of 7.0 to 11.0 mils. Whereas, "Mylar" is to be understood as the preferred material for the uncoated sheets, it will be recognized that other materials may be employed for this purpose. There may be mentioned in this regard vinyl acetate, paper, aluminum foil and any flexible or non-flexible material which is conventionally used as a backing for magnetic coating compositions. The operations performed in the blanking and punching steps are first blanking of the sheets to circular form to make them disks and thereafter punching a central hole in each disk of approximately 0.500 in. diameter and three holes 120° apart with a bolt circle 2.000 in. from the center of the disk. These last mentioned holes will have a diameter of approximately 0.250 in. The initial blanking produces what will be an oversized disk and thus allows for trimming of the disk after the coating operation.

After the disks have been formed and punched they are placed in a suitable disk storage indicated in Figure 1 by the numeral 35. It is important that the disk be stored in a clean container until needed as the success of the coating operation depends upon the total absence of any foreign material either in the disk or in the coating dispersion. When the actual coating operation is to commence, the disks are removed from the storage 35 and are brought to the coating operation which occurs in block 36, according to Figure 1. The magnetic dispersion is removed from storage 33 and brought to the coating operation after first being filtered (see block 40). As mentioned previously, the success of the coating operation is dependent upon the complete elimination of foreign material. Thus, the dispersion is filtered preferably though double filter cones made of 64 x 56 thread per inch cloth although any other suitable filter may be used. The filtrate is received in beakers of a convenient size, for example, 50 cc. to 400 cc. These beakers have been previously vacuum cleaned in a dust-free box. After being filtered, the dispersion-containing beakers are placed on a tray and covered with a clean can which has also been vacuumed. This then permits the filtered dispersion and the beakers to be physically transported to the actual coating operation conducted in block 36. As the dispersion has a tendency to settle out, that is to say, the heavy iron oxide particles tend to settle to the bottom, a constant cycle of cleaning, filtering and coating must be maintained. For this reason the dispersion is retained in storage 33 until it is actually needed for a coating operation in block 36. When this time occurs, the dispersion is withdrawn from storage 33, filtered and prepared and forthwith brought to the coating operation for immediate use.

The actual coating operation is conducted by placing a blank withdrawn from storage 35 on a turntable which is operated by an air motor. During the rotation of the blank, it is cleaned of any dust particles which may be attracted to the blank by an electrostatic brush. This problem is particularly evident when using "Mylar," since this material has a tendency to build up a large static charge which attracts dust in the air. The turntable is preferably rotated at a speed from 100 to 160 r.p.m. during the entire coating operation. It will be appreciated that the coating operation is also conducted in a dust-free box. For this purpose the box is maintained substantially dust-tight and air is blown through the chamber defined by the box at a preferred rate of from 50 to 100 c.f.m. With the disk cleaned of dust and a sufficient quantity of the dispersion filtered and ready for use, the dispersion is poured onto the blank, starting at the center and proceeding outwardly at a definite speed and rate of flow. It has been found that the pouring of dispersion on the blank is a technique which can be easily and readily acquired by a worker and for this reason the need for mechanization of this step of the method has not arisen. After pouring the disposition on the disk while it is rotating as above defined, rotation of the disk is continued to first coat by centrifugal action all areas of the disk surface and then to spin dry the coating. It has been discovered that the coating will fully dry in approximately 5 minutes under the conditions set forth above. When dried, the disk is turned over and the operations above described are repeated to coat the other side.

When both sides of the disk have been coated and are dry, the disk is removed from the coating operation and the disk is now trimmed to the correct diameter. During the trimming operation, indicated by block 37, the edge effect which has been produced on the disk during the coating operation is removed. After trimming, the disk is polished (see block 38 of Figure 1) by being placed on a mandrel turning at 1750 r.p.m. and rubbed with a fiberglass pad. The disk is then inspected, symbolized, packed, finally inspected and stored, these operations being conducted in block 39.

Figure 2:
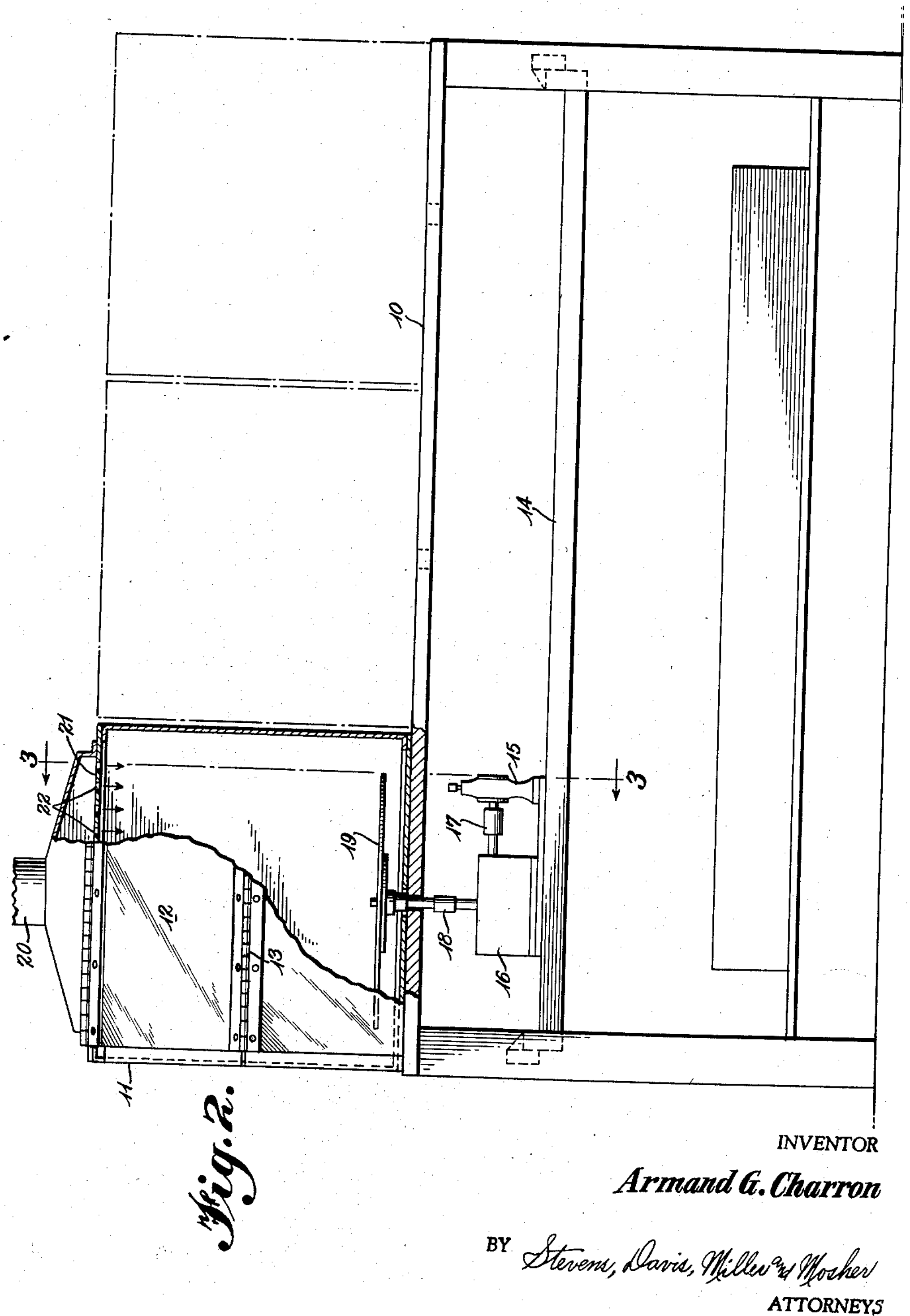
Figure 2 is a view in front elevation partly broken away of the apparatus of the present invention which is used during the coating step.

Referring to Figures 2 and 3, there will be described apparatus particularly adapted for carrying out the method of the present invention. As will be evident, the apparatus is concerned with the actual coating of a disk. For this purpose there is provided a table, identified generally by the numeral 10, upon which is mounted a series of boxes 11, only one of which is shown in solid lines in Figure 1. Each box 11 is provided with an inclined transparent sight plate 12 which is hinged to the box 11 along its lower edge as indicated at 13. The front wall of the box 11 is likewise composed of a transparent material in order to allow for visual inspection of what transpires within the box 11. Beneath the top of table 10 is a suitable framework 14 upon which is mounted an air motor 15 and a gear reducer 16. The drive shaft of the air motor 15 is coupled to the input of gear reducer 16 by means of coupling 17. The output of gear reducer 16 is connected by coupling 18 to the shaft of a turntable 19. The shaft of the turntable projects through the surface of table 10 and the bottom of box 11 so that the turntable 19 lies wholly within the box 11 spaced slightly above its bottom surface. As will be particularly evident from Figure 3, the axis of the turntable lies closer to the rear wall of box 11 than to the front wall. The reason for this is to create a larger available space at the access through the front of box 11 which in turn provides more work space and gives better access to the turntable during pouring of dispersion on a disk positioned on the turntable. A hood 20 is connected to the top side and to the rear of box 11 and leads from a source of clean air under pressure. Intermediate the hood 20 and the interior of box 11 is a diffuser plate 21, drilled with a number of holes 22, which serves to break up the stream of inlet air and distribute it uniformly throughout box 11. A conduit 23 is connected to the underneath side and to the front of box 11 to provide a return or exhaust for air introduced through hood 20. This arrangement provides an efficient, uniformly distributed air circulation through box 11.

Although the present invention shows and describes a preferred embodiment, nevertheless such changes and modifications as are obvious to one skilled in the art from a knowledge of the teachings of the present invention are deemed to be within the spirit and scope of the present invention.

What is claimed is:

A method of preparing a disk coated with a dispersion comprised of from about 30% to about 40% by weight of solids of which from about 70% to about 80% by weight are magnetic iron oxide particles and the remainder of the solids is resin, with the remainder of the dispersion being solvent to produce a magnetizable record medium suitable for multi-channel magnetic recording which includes the steps of forming a dispersion of magnetic iron oxide particles, resin and solvent, blanking a rectangular sheet of backing material into an over-sized disk, cleaning said over-sized disk to free it from dust, rotating said over-sized disk in a dust-free zone at a velocity of from about 100–160 revolutions per minute, filtering said dispersion, pouring said filtered dispersion onto said disk, continuing the rotation of said disk to cause said dispersion to distribute itself by centrifugal action over the entire surface of said disk, passing a dust-free gas through said dust-free zone at a controlled rate of from about 50 to 100 cubic feet per minute to cause the vaporization of solvent, removing said coated disk from said dust-free zone, polishing said disk and trimming said disk to proper size by removing the edge effect resulting from the distribution of the dispersion by centrifugal action.

References Cited in the file of this patent

UNITED STATES PATENTS

| | | |
|---|---|---|
| 771,669 | Schneegass | Oct. 4, 1904 |
| 2,110,282 | Amsel | Mar. 8, 1938 |
| 2,356,946 | Powers | Aug. 29, 1944 |
| 2,386,591 | Campbell | Oct. 9, 1945 |
| 2,407,179 | Savage | Sept. 3, 1946 |
| 2,524,433 | Downs et al. | Oct. 3, 1950 |
| 2,525,601 | Howell | Oct. 10, 1950 |
| 2,580,131 | Rowell | Dec. 25, 1951 |
| 2,594,893 | Fans | Apr. 29, 1952 |
| 2,699,999 | Mahler | Jan. 18, 1955 |
| 2,760,882 | Teves et al. | Aug. 28, 1956 |
| 2,787,560 | Shaw | Apr. 2, 1957 |